US009642341B2

(12) United States Patent
Lipford et al.

(10) Patent No.: US 9,642,341 B2
(45) Date of Patent: *May 9, 2017

(54) HUMMINGBIRD FEEDER AND FEED POD

(71) Applicant: Perla, LLC, Bel Air, MD (US)

(72) Inventors: Brian Lipford, Bel Air, MD (US); Sharon Lipford, Bel Air, MD (US); Keith Lipford, Baltimore, MD (US); Christopher Dykes, Columbia, MD (US)

(73) Assignee: Perla, LLC, Bel Air, MD (US)

( * ) Notice: Subject to any disclaimer, the term of this patent is extended or adjusted under 35 U.S.C. 154(b) by 55 days.

This patent is subject to a terminal disclaimer.

(21) Appl. No.: 14/925,339

(22) Filed: Oct. 28, 2015

(65) Prior Publication Data

US 2016/0128308 A1    May 12, 2016

Related U.S. Application Data

(63) Continuation-in-part of application No. 14/578,971, filed on Dec. 22, 2014.

(60) Provisional application No. 62/022,872, filed on Jul. 10, 2014, provisional application No. 62/077,937, filed on Nov. 11, 2014.

(51) Int. Cl.
*A01K 39/00* (2006.01)
*A01K 39/02* (2006.01)
*A01K 39/012* (2006.01)
*A01K 39/01* (2006.01)

(52) U.S. Cl.
CPC ............. *A01K 39/012* (2013.01); *A01K 39/00* (2013.01); *A01K 39/01* (2013.01); *A01K 39/02* (2013.01); *A01K 39/0206* (2013.01)

(58) Field of Classification Search
CPC ........ A01K 39/00; A01K 39/01; A01K 39/02; A01K 39/0206
USPC .............. 119/52.2, 52.3, 57.8, 57.9, 72, 72.5
See application file for complete search history.

(56) References Cited

U.S. PATENT DOCUMENTS

| 5,507,249 | A | * | 4/1996 | Shaw ................. A01K 39/0206 119/72 |
| 5,640,927 | A | | 6/1997 | Klein |
| 5,947,054 | A | | 9/1999 | Liethen |
| 6,739,284 | B1 | | 5/2004 | Olive |
| 7,634,974 | B1 | * | 12/2009 | Puckett ................ A01K 39/014 119/61.57 |
| 8,245,667 | B2 | * | 8/2012 | Mateer ............... A01K 39/0206 119/77 |
| 8,276,541 | B2 | | 10/2012 | LoRocco |
| 8,291,861 | B2 | | 10/2012 | Hepp |
| 8,387,567 | B1 | | 3/2013 | Hill |

(Continued)

*Primary Examiner* — David Parsley
(74) *Attorney, Agent, or Firm* — Larry J. Guffey, Esq.; Oliver & Grimsley, LLC

(57) ABSTRACT

A hummingbird feeder that is easier to maintain and reduces food spoilage includes a feed pod support adapted to hold a hummingbird feed pod that proportionally resembles the thickening part of the stem of an actual-size flower, a flower top or cover for the pod, an elongated stem that is attached to the feed pod support, a 'feeding' perch adapted to provide a hummingbird with a place to rest while extending its beak through a feeding hole in the flower top, a 'high' perch to provide a hummingbird with a place to perch while not feeding, and wherein the feed pod can be either of the type that allows for a single-use or, with refilling, multiple uses.

10 Claims, 2 Drawing Sheets

(56) References Cited

U.S. PATENT DOCUMENTS

| | | |
|---|---|---|
| 8,539,910 B1 | 9/2013 | Hensley |
| 8,763,556 B1 | 7/2014 | Vaugn, Jr. |
| 2004/0103851 A1* | 6/2004 | Hunter .................. A01K 39/02 119/72 |
| 2005/0126503 A1 | 6/2005 | Fort, II |
| 2009/0308321 A1* | 12/2009 | Szczygiel-Durante A01K 39/0206 119/72 |

* cited by examiner

HUMMINGBIRD FEEDER AND FEED POD

CROSS-REFERENCE TO RELATED APPLICATIONS

This a Continuation-In-Part patent application and claims the benefit of U.S. Provisional Patent Application No. 62/022,872, filed Jul. 10, 2014, and entitled "Hummingbird Feeder," and U.S. Provisional Patent Application No. 62/077,937, filed Nov. 11, 2014, and entitled "Hummingbird Feeder and Feed Pod," and U.S. patent application Ser. No. 14/578,971, filed Dec. 22, 2014, and entitled "Hummingbird Feeder And Feed Pod," and the entire specifications of all of the aforementioned applications are hereby incorporated herein in their entirety by reference.

BACKGROUND OF THE INVENTION

1. Field of the Invention

The present invention generally relates to bird feeders, and specifically, to a hummingbird feeder and a feed pod for providing a food substance, such as a solution of sugar and water, for hummingbirds.

2. Description of the Related Art

Typical hummingbird feeders hold about 8 to 12 ounces of liquid food (or more), which is usually a sugar-water mixture (about 4 parts water to 1 part sugar). The liquid food is in contact with the feeder, which sits outside in hot, ambient weather, many times in direct sunlight. This sugar-water mixture or liquid hummingbird food creates a natural habitat that grows algae and other bacteria that contaminate the food, as well as sticking to the surfaces of the feeder that the food touches. If this food is not replaced with clean food, the algae and growth can harm and even kill hummingbirds that ingest it. In the heat of mid-Summer, the feeder may need to be emptied and cleaned every 2 to 3 days. In cooler periods of Spring and Fall, the feeder can be emptied and cleaned less often, typically once every week or two. This is a bothersome chore that challenges even the most avid hummingbird enthusiast.

Cleaning current hummingbird feeders is involved and troublesome in that the feeders have nooks and crannies where the mold and algae growth deposits. Small cleaning tools and brushes are often needed, frequently with a diluted bleach solution, to remove the mold and growth. Failure to remove the mold and growth provides sites that accelerate new growth when fresh food is placed in the feeder.

Another challenge faced by the hummingbird enthusiasts is the mixing, cooking and storage of the liquid food for the birds. In many regions of the US, the hummingbird populations are such that a typical feeder sees relatively low traffic, with the birds consuming only a small fraction of the food from the feeders before the food spoils and must be discarded. Many times 80 to 90% of the food is discarded due to spoilage. This is somewhat discouraging since there is substantial effort in making and storing the liquid food for the feeders.

As previously noted, the food is a sugar-water mixture. To protect the hummingbirds from non-sterile food and to help extend the life of the food, the water must be boiled before mixing in the sugar. Many hummingbird enthusiasts make their own food in volumes of about a quart or half gallon and store it in their refrigerator. One quart of liquid food (32 oz) will fill a 12 ounce feeder about 3 times, which is a little more than one week of food in the Summer. As such, the hummingbird enthusiast is forced to continually process, cook and store new liquid food mixture.

Handling the liquid food and the feeders is also a burden. Because the feeders regularly need cleaning and refilling, the hummingbird enthusiast needs to bring the feeder into the home, probably working near a sink, to flush out the old food and clean the feeder. Once the feeder is cleaned, new liquid food is poured into the feeder. The liquid food is usually stored in the refrigerator in a pitcher, jar or other bulk liquid holding container. Once the feeder is cleaned and refilled, it is carefully carried back outside and hung or positioned back in its normal location.

In summary, current feeders are hard to clean and maintain, and frequently, because of these problems, cause significant wastage of the liquid hummingbird food that the owner of the feeder will often have spent considerable effort to make and store in a refrigerated environment. There is a need for improved hummingbird feeders and their required methods of handling and distributing hummingbird food.

SUMMARY OF THE INVENTION

Recognizing the need for improved methods, devices and systems for feeding hummingbirds, the present invention is generally directed to providing such improved methods, devices and systems.

In a preferred embodiment, the present invention is a hummingbird feeder that includes: (a) a body or feed pod forming a reservoir with a specified interior volume that has a tubular wall, top and bottom ends, a bottom surface attached to the bottom end, and the top end having a perimeter rim surrounding an opening into the reservoir, and wherein a longitudinal axis extends between these ends and the distance between them defines the height of the body which is set so that the long beak and tongue of a hummingbird reaches a point proximate the body's bottom surface, and (b) wherein the reservoir of this body has an interior volume in the range of 10-50 ml so as to allow the configuration of the feed pod to resemble the thickening part of the stem that proportionally makes up the lower part of an actual-size flower.

Such a feed pod can also be adapted to provide for either the reuse (i.e., by the refilling of its reservoir with a quantity of liquid hummingbird food) or the single-use of the feed pod.

When adapted for reuse, the feed pod will typically also include: (c1) a partial lid adapted to prevent the spillage of liquid hummingbird food when the longitudinal axis of the body is tilted and oriented at an angle relative to vertical, (d1) a gripping surface attached to the body's tubular wall that is adapted to aid a user of the hummingbird feed pod in its handling, (e1) fabricating the body from a translucent material so as to provide external visibility of the liquid hummingbird food contained within the body's reservoir, (f1) adapting the feed pod to allow for the hygienic cleaning and refilling of its reservoir with liquid hummingbird food at the site where the feed pod is located when in use, (g1) a refillable, liquid squeeze container for use in the reservoir's refilling, and (h1) an overflow port extending through the body's tubular wall that is located proximate the body's perimeter rim and above a gripping surface that is configured to perform as an overflow channel to, upon the occurrence of the feed pod being overfilled, direct the excess liquid hummingbird food away from the feed pod support and the other parts of the feeder such that the liquid food does not come in contact with the feeder.

When adapted for a single-use, the feed pod will typically also include: (c2) an inner cover sealing the opening into the reservoir that provides a top lid to contain the liquid hummingbird food and prevents the spillage when the longitudinal axis of the feed pod is tilted and oriented at an angle relative to vertical, (d2) a quantity of liquid hummingbird food contained within the reservoir, and wherein the inner covering has an access hole therein that is configured to allow the long beak and tongue of the hummingbird to pass through the access hole so as to gain access to the liquid hummingbird food while also preventing such access to bees and other insects, and (e2) an outer cover configured to removably attach to the inner cover so as to temporarily seal the access hole until this outer cover is removed so as to provide a hummingbird access to the reservoir's liquid hummingbird food.

In a variation of this preferred embodiment, the present invention is also a hummingbird feeder that includes: (a) a feed pod support having a configuration adapted to hold and support such a previously described hummingbird feed pod and to prevent the liquid hummingbird food from contacting any portion of the feeder other than the interior volume of the feed pod's reservoir, (b) a flower top that has a configuration adapted to resemble the spreading petals of an actual-size flower and which includes a feeding hole that extends through the flower top which is attached to the feed pod support in such a manner so as to allow the flower top to move between an open position that provides access to a feed pod and a closed position that covers the top end of the feed pod's body, (c) an elongated stem having a base end and a top end that is attached to or integral with the feed pod support and a configuration adapted to proportionally resemble the actual-size stem of a flower and to allow the feed pod support to be located at a distal location with respect to the stem's base end, (d) a perch that is attached to or integral with the flower top and has a configuration adapted to provide a hummingbird with a place to rest while extending its long beak through the flower top's feeding hole, (e) a second 'high' perch that provides a hummingbird with a place to rest when not feeding, and (f) an ant dam that is integral with the feeder and has a configuration adapted to prevent crawling insects from traveling along the feeder so as to reach the feed pod and the liquid food contained therein.

Thus, there has been summarized above (rather broadly and understanding that there are other preferred embodiments which have not been summarized above) the present invention in order that the detailed description that follows may be better understood and appreciated.

DESCRIPTION OF THE PREFERRED EMBODIMENT

Figure 1:
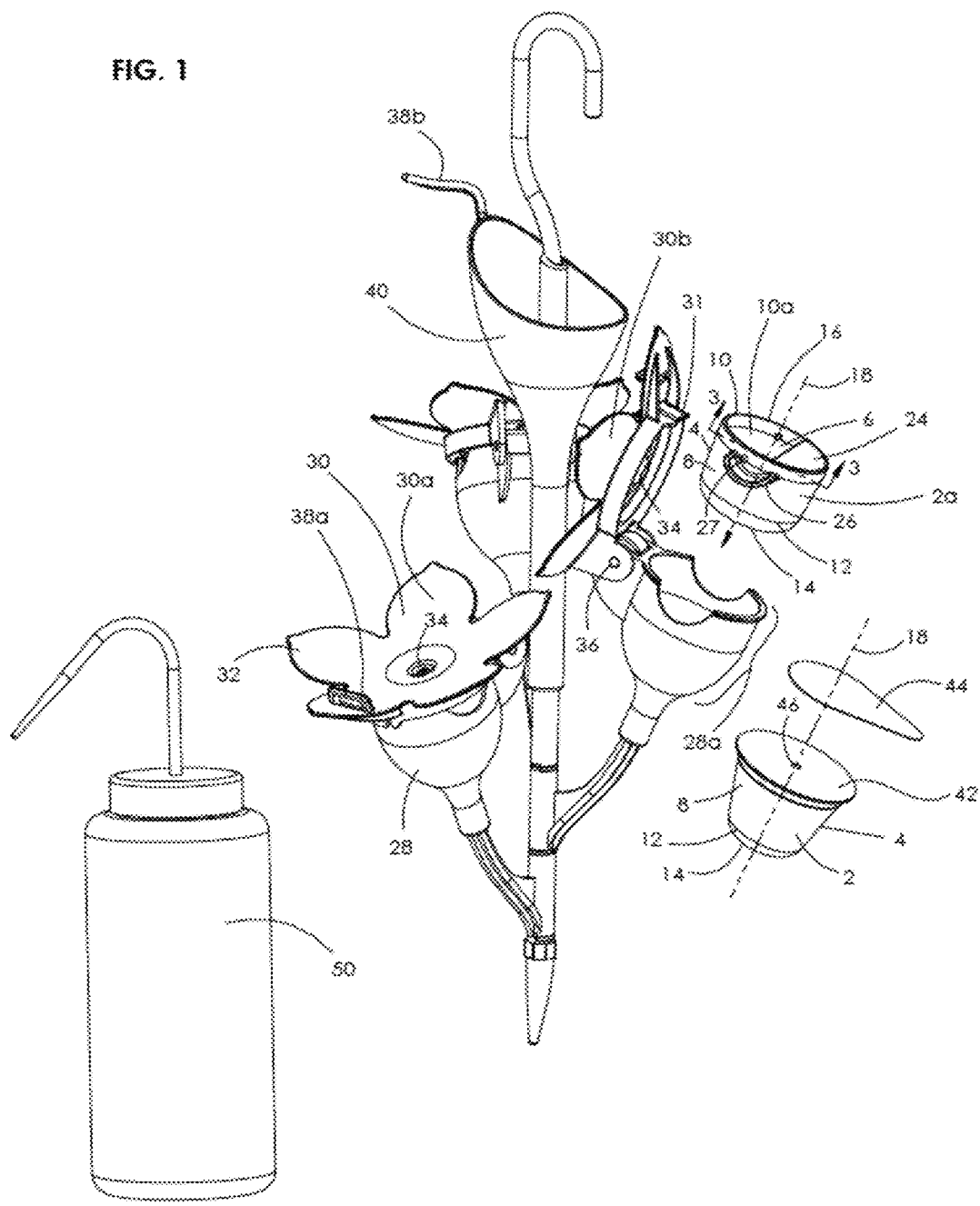
FIG. 1 is a perspective illustration of a preferred embodiment of the present invention in the form of a 3 stemmed feeder which has the flower top on one of its feed pod supports open and a reusable feed pod shown situated above the support in which it will sit when in use and a single-use feed pod shown to the side.

Before explaining at least one embodiment of the present invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

Figure 2:
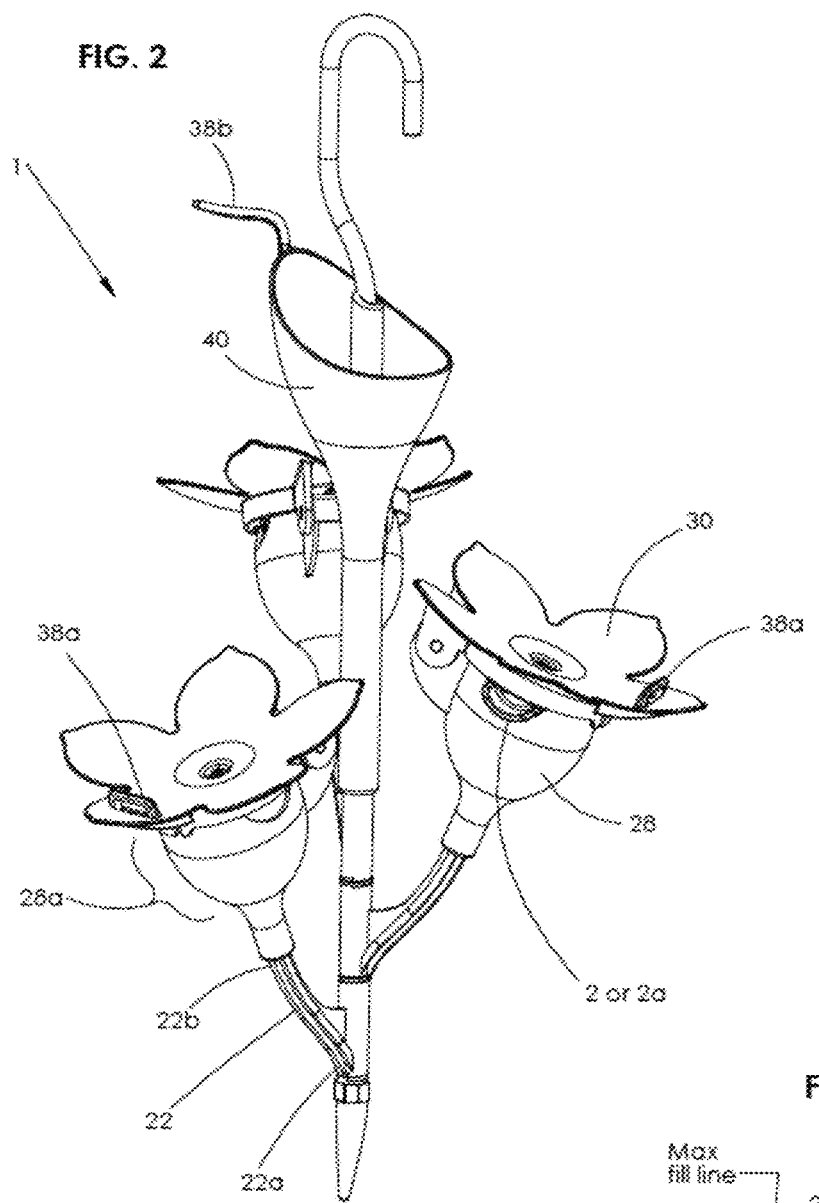
FIG. 2 is another perspective illustration of a preferred embodiment of the hummingbird feeder of the present invention with all of its three flower tops closed.

The present invention generally relates to apparatuses and methods for feeding hummingbirds. FIGS. 1 and 2 provide a perspective illustration of a preferred embodiment of the present invention.

It is seen to consist of a hummingbird feeder that includes a body 4 or feed pod 2, 2a forming a reservoir 6 with a tubular wall 8, top 10 and bottom 12 ends, a bottom surface 14 attached to the bottom end, and the top end having a perimeter rim 16 surrounding an opening into the reservoir, and wherein a longitudinal axis 18 extends between these ends and the distance between them defines the height of the body which is set so that the long beak and tongue of a hummingbird can reach a point proximate the body's bottom surface 14 when a hummingbird is perched above the top of the reservoir 6, and wherein this body also has a configuration adapted to resemble the thickening part 28a of the stem 22 that makes up the lower part of an actual-size flower.

Figure 3:
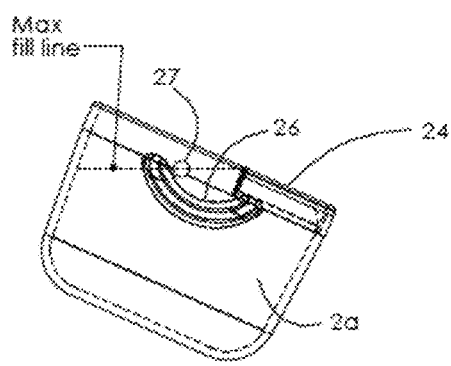
FIG. 3 is a cross sectional view of a reusable feed pod that has been filled to capacity (see the maximum fill line) with liquid hummingbird food; note the pod's overflow port.

Such a feed pod may have a configuration adapted to provide for the reuse of the feed pod by the refilling of its reservoir with a quantity of liquid hummingbird food. This configuration of a reusable feed pod 2a can also include: an integral or removable partial lid 24 adapted to prevent the spillage of liquid hummingbird food when the longitudinal axis 18 of the body is tilted and oriented at an angle relative to vertical, one or more gripping surfaces 26 attached to the body's tubular wall 8 and which are adapted to aid a user of the hummingbird feed pod in its handling, fabricating the body from a translucent material so as to provide external visibility of the liquid hummingbird food contained within the body's reservoir so that one tasked with refilling the feed pod will know when to refill it, and adapting the feed pod 2a to allow for its hygienic cleaning and refilling of its reservoir with liquid hummingbird food at the site where the feed pod is located when in use. The gripping surfaces 26 of the feed pod 2a mate with corresponding cut outs in feed pod support 28 to align the partial lid 24 relative to the feeder 1 such that the partial lid is oriented correctly to help contain fluid in the feed pod 2a. An overflow feature is provided in the reusable feed pod via an overflow port 27 that is located proximate the body's perimeter rim and above a gripping surface and extends through the body's tubular wall. Additionally, the body's gripping surfaces 26 are configured so that they can perform as overflow channels to, upon the occurrence of the feed pod being overfilled, direct the excess liquid hummingbird food away from the feed pod support 28 and the other parts of the feeder such that the liquid food does not come in contact with the feeder (which would make the feeder dirty, and require cleaning). See FIG. 3.

Such an adaptation can, for example, include making: (i) the opening into the reservoir 6 of a comparatively large surface area so as to help the operator of the feeder to easily reach all of the inner surfaces of the reservoir, and (ii) the volume of the feed pod comparatively small (e.g., typically in the range of 10-50 ml, and more preferably in the range of 20-35 ml) so that: it can easily be cleaned using, if necessary, one's finger tip, and the height of the body is such that the long beak and tongue of a hummingbird can reach a point proximate the body's bottom surface when the hummingbird is perched above the feed pod (typical body heights are in the range of 1-5 cm). Such a short and small-volume feed pod is also helpful in making an overall feeder that, for aesthetic reasons, actually resembles some sort of actual-size, flowering plant and in helping to prevent wasteful hummingbird feed spoilage within the feeder.

The feed pod 2 or 2a of the present invention is contained within a hummingbird feeder 1 that includes: a feed pod support 28 having a configuration adapted to hold a hummingbird feed pod 2 or 2a and to resemble the thickening part 28a of the stem 22 that makes up the lower part of a single, actual-size flower, a flower top 30 or lid which includes a feeding hole 34 that extends through the flower top and its top 30a and bottom sides 30b. The body of the feed pod has a configuration adapted to resemble the center of a single, actual-size flower so that the body's interior volume fits within a region defined by the spreading of the petals 32 of the flower and the thickening part of the stem from which the flower grows. The flower top 30 is attached to the feed pod support with a hinge 36 so as to allow the flower top to move between an open position that provides access to a feed pod and a closed position that covers the top end of the feed pod's body 4.

This hummingbird feeder also includes an elongated stem 22 having a base end 22a and a top end 22b that is attached to the feed pod support 28 and with the stem further having a configuration adapted to proportionally resemble the actual-size stem of a flower and to allow the feed pod support 28 to be located at a distal location with respect to the stem's base end 22a. The stem material and cross section properties are selected such that the stem can withstand the deadweight and applied moments applied to the stem due to the weight of the feed pod 2 or 2a, feed pod support 28 and flower top 30. The flower top 30 also has a slight interference type snap feature or closing element 31 that helps prevent the flower top from inadvertently opening (e.g., during windy conditions).

This hummingbird feeder 1 may also include: a 'feeding' perch 38a that is associated with the flower top 30 by being either attached to or integral with it and has a configuration adapted to provide a hummingbird with a place to rest while extending its long beak through the flower top's feeding hole 34, an ant dam 40 that has a configuration adapted to prevent crawling insects from traveling along the feeder so as to reach the feed pod, a 'high' perch 38b that is associated with the ant dam 40 by being either attached to or integral with it so as to provide a hummingbird with a place to rest near the feed pod but when not actively feeding, and wherein the feed pod's configuration is further adapted to provide for the use of either a single-use, discard-after-using, feed pod 2 or a reusable feed pod 2a that allows for the refilling of the body's reservoir with a liquid hummingbird food (e.g., both versions can use essentially the same body 4, with the single-use version having an inexpensive, permanent top 42 with a tear-away seal 44 that reveals an access hole 46 in the permanent top and through which a hummingbird may extend its beak to reach the food within the pod).

The present invention has many unique design features. For example, the above described, hummingbird feeder 1 provides a structural frame that supports the feed pods 2 or 2a and the liquid food contained within them in such a manner that this liquid food does not come in physical contact with the feeder itself. This key design feature eliminates the need to hygienically clean the feeder every few days. By limiting the liquid food to touching just the feed pod 2 or 2a, only the feed pod needs to be cleaned and/or replaced.

Another critical feature of these feed pods is that they are small, easy to hold and clean, with a large open top 10a and easy access to the inside 'wetted' region of the feed pod. There is no gravity-fed reservoir that is difficult to access and clean. In a preferred embodiment, a feed pod holds about one fluid ounce of liquid (about 30 ml), although the design can accommodate different size feed pods that can hold more or less. The small size with this design approach allows the feed pod to easily sit in the palm of your hand. This makes them easy to hold and clean using something as simple as a wet paper towel and one's fingertip. Special tools and small cleaning brushes are not required.

The feed pods are also designed to be small to limit the liquid food that they hold. The small volume is purposeful and important in that it reduces the wastage of the food. The average hummingbird reportedly weighs approximately five (5) grams (the weight of a U.S. nickel), and on average eats about half its weight in food per day, or 2.5 grams. One ounce of a sugar-water mixture weighs about 37 grams. As such, the feed pods holding one (1) ounce of liquid food can feed about 15 hummingbirds. This is about 5 hummingbirds per day for 3 days, which is a reasonable time period before the food would spoil in the summer heat.

A feeder 1 that contains three (3) separate feeders and feed pods, as shown in FIGS. 1 and 2, can feed about 15 hummingbirds each day for 3 days. This allows for significant traffic of hummingbirds, more than sufficient for many areas of the US where the birds migrate and live.

Such a feeder 1 has an aesthetically pleasing configuration with a preferred embodiment that resembles a flowering plant, with one or more stems, flowering bodies and flowering tops. To enhance the aesthetic and realism of the flower shape, the individual stems can be tilted at varying angles of up to about 30 degrees or more from vertical.

The flower top 30 of the feeder is hinged to rotate up and out of the way. In the closed position, the flower top (and mating feed pod support) restricts access to the hummingbird liquid food to a small through-hole 34. The restricted access and hole are sized to allow the hummingbird's beak and tongue to access the liquid food, but restrict bees and other insects. When the flower top 30 is rotated to its up position, it allows easy access to the feed pods 2 or 2a, to remove, clean, refill or replace them as desired. This design approach is important since the relatively large flower top allows the feed pods to also have a relatively large access opening for cleaning and refilling (for the reusable feed pod). The top of the flower also has an integral perch 38a near the feeding hole 34, with a low profile to maintain aesthetics. This allows the bird to rest on the perch while feeding. The snap feature 31 between the flower top 30 and the feed pod support 28 helps prevent the flower top from inadvertently opening.

The body 4 of the feed pod is fabricated from a translucent material so that it is clear such that the hummingbird enthusiast can visibly see when the liquid food in the feed pod is gone or has spoiled (when it becomes a cloudy color or there is visible algae growth). If the feed pod support 28 has sides that would otherwise obstruct one's view of the feed pod, these sides are also preferably fabricated from a translucent material.

Using the present invention, a variety of feeder designs can be created that resemble different types of flowers, including daffodils, calla lily's, roses, daisies, tulips, etc. It is also recognized that shapes other than flowers could easily be used that could achieve the same functionality as noted herein.

Such flower feeders can be arranged or assembled together in groups to resemble a bouquet. The arrangement of feeders could include different types of flower tops and colors, different number of stems with differing stem lengths and stem orientations from the vertical.

As shown in FIGS. 1 and 2, the assembly of three stems has an integral ant dam 40 that can be used (when filled with water) as a barrier to keep ants and other crawling insects from gaining access to the feeder and the liquid food. The ant dam is designed to be aesthetically pleasing by resembling a small stem feature on a real flower. A similar ant dam could also be provided for other arrangements of feeders, from a single stemmed feeder to a many-stemmed feeder. Integral with the ant dam 40 is a 'high' perch 38b, to allow a hummingbird to rest near the feeder when not feeding. This has value in that hummingbirds can be territorial and protective of their food sources. This 'high' perch allows the hummingbird to stay close to their food source, while also staying visible to the human birdwatchers, who like to look at the birds.

Two optional feed pods 2 and 2a can be used interchangeably in the feeder 1 of the present invention. The 'reusable feed pod' 2a is made of a clear or translucent plastic like polycarbonate (about 0.05 inch wall thickness) that is designed to withstand cleaning/washing and reuse many times at the discretion of the owner. The reusable feed pod has a large top access opening 10a with easy access to the wetted region inside the feed pod to facilitate cleaning. There are gripping surfaces 26 on the body that facilitate removing and replacing the feed pod. The translucent or clear body of the reusable pod allows the hummingbird enthusiast to visually see when the food in the pod is gone or has spoiled. To simplify the design, the reusable pod does not have a separate lid. Instead, the reusable pod 2a has an integral partial lid 24 that allows the pod to hold extra fluid without spilling (if the feeder and the feed pod are tilled at an angle relative to vertical). The gripping surfaces 26 of the feed pod 2a mate with corresponding cut outs in feed pod support 28 to align the partial lid 24 relative to the feeder 1 such that the partial lid is oriented correctly to help contain fluid in the feed pod 2a. The reusable pod will usually be an injection molded part that by design has no nooks or crannies that can provide places for mold or algae to stick or hide, making it easy to clean.

A second optional feed pod 2 is a 'disposable' or single-use pod made of a thin, clear or translucent plastic like polypropylene or polystyrene (about 0.007 inch wall thickness). The material and thickness can vary, but are chosen to allow low production costs that are not intended or designed to withstand cleaning or reusing. This pod has a thin, two-layer top cover, consisting of a bottom or permanent cover 42 and a top cover or seal 44. The bottom cover is sealed to the perimeter rim of the pod, to provide a leak-proof seal. The bottom cover also has a center access hole 46 that is comparable to and aligns with the opening in the top flower 34 to provide access to the liquid food in the pod, as well as help contain the fluid in the feed pod 2 when the longitudinal axis of said feed pod is tilted up to 30 degrees from vertical. A top cover 44 is secured to the bottom cover 42 by an adhesive or other means that securely retains and seals fluid from escaping from the access hole in the bottom cover. The top cover can be easily peeled off, possibly with a tab to facilitate its removal. Once the top cover is removed, the hummingbirds are given free access to the hummingbird food through the access hole 46 in the bottom cover. The top and bottom covers are made of a thin foil material, possibly with a thin plastic cover. The translucent or clear body of the disposable pod allows the hummingbird enthusiast to visually see when the food in the pod is depleted or has spoiled. Cut outs in the feed pod support 28 facilitate the removal of the depleted feed pod, making it easier to grasp the upper rim of the feed pod 2.

Food handling with the present invention is straightforward when the disposable feed pods 2 are used. When the pods are empty or the food has spoiled, the operator of the feeder simply hinges open the top flower on the feeder, removes and discards the old feed pod 2 and replaces it with a new feed pod. The top cover or seal 44 is peeled off before the new feed pod is loaded in the feeder.

The present invention provides a unique and novel system for handling, storing and refilling its reusable feed pods 2a. As noted above, most feeders are brought indoors to clean and refill, before carrying them back outside. The reusable feed pods of the present invention provide an improved cleaning & refilling workflow that reduces the burden of refilling and handling the feeder. The key to this improved workflow is a combination of three design attributes unique to the present feeder 1, these include: (i) using small feed pods, with their relatively small fill volumes, (ii) using feed pods with a large top open area and easy access to clean the inside of the pods locally at the feeder using a wet paper towel (versus needing to bring the feeder inside the house to clean it with special brushes), and (iii) a means to easily refill the relatively small feed pods outside at the feeder—e.g., a refillable, liquid squeeze container 50.

This improved work flow starts with the use of a liquid squeeze container 50 that has an integral nozzle that can direct fluid out of the nozzle by squeezing the container. The liquid squeeze container also has a removable funnel (not shown) that can be placed on top of the container to facilitate the initial loading of liquid food in the container. Once the squeeze bottle container is loaded with fluid, it can be stored in the refrigerator and pulled out when needed.

When the feed pods 2a of the hummingbird feeder 1 of the present invention are ready to be cleaned and refilled, the operator removes the liquid squeeze bottle, containing the liquid hummingbird food, from a refrigerator along with a wet paper towel (optional) and then carries the squeeze bottle and the paper towel out to their feeder. One empties each feed pod 2a and quickly wipes the inside of each pod, before placing them back in the feeder. The operator then uses the squeeze bottle to refill each pod, by aiming the nozzle at each pod and squeezing the bottle. Using this approach, the feeder no longer needs to be carried inside for cleaning and refilling. The cleaning and refilling can be done outside at the location when the feeder is usually situated when in use.

Given this unique refilling method at the site of the feeder, it is probable that on occasion, the operator may inadvertently overfill the reusable feed pod which could allow liquid hummingbird food to overflow into its feed pod support 28 and the other parts of the feeder. To avoid this, an overflow port 27 is located in the tubular wall of the feed pod in such a way that when the feed pod is full (near to the capacity of the partial lid 24), the excess liquid hummingbird food will pour out of the overflow port 27 and flow into the body's gripping surfaces 26 that have been configured to perform as an overflow channel that direct the excess liquid hummingbird food away from the feed pod support 28 and the other parts of the feeder.

The foregoing is considered as illustrative only of the principles of the present invention. Further, since numerous modifications and changes will readily occur to those skilled in the art, it is not desired to limit the invention to the exact construction and operation shown and described herein. Accordingly, all suitable modifications and equivalents may be resorted to, falling within the scope of the invention that is hereafter set forth in the claims to the invention.

We claim:

1. A hummingbird feeder that is provided by a provider for use by a hummingbird having a long beak and a tongue, said hummingbird feeder comprising:
   a feed pod forming a reservoir with a specified interior volume, said feed pod having a tubular wall with top and bottom ends and with a bottom surface attached to said bottom end, and said top end having a perimeter rim surrounding an opening into said reservoir, and wherein a longitudinal axis extends between said ends and wherein the distance measured along said longitudinal axis between said ends defines the height of said feed pod,
   wherein said height of said feed pod is set so that the long beak and tongue of said hummingbird reaches a point proximate to said bottom surface of said feed pod when said hummingbird is perched above said feed pod,
   wherein the entirety of said feed pod having a configuration adapted to resemble the center of a single, actual-size flower so that the entire interior volume of said feed pod fits within a region defined by the spreading of the petals of said single, actual-size flower and the thickening part of the stem from which said single, actual-size flower grows,
   wherein the configuration of said feed pod is further adapted to be bowl-shaped and to have a large open top that provides direct line of sight access to the entire interior volume of said reservoir,
   a feed pod support having a configuration adapted to hold and support said hummingbird feed pod, and
   a flower top that is pivotably attached to said feed pod support and has top and bottom sides between which extends a feeding hole and said flower top having a configuration adapted to resemble the spreading petals of an actual-size flower and to allow said flower top to move between an open position that provides access to said feed pod and a closed position that covers the top end of said feed pod.

2. The hummingbird feeder pod as recited in claim 1, wherein:
   said feed pod having a configuration adapted to provide for the reuse of said feed pod that includes the refilling of said reservoir of said feed pod with a quantity of liquid hummingbird food, and the hygienic cleaning of said reservoir at the site where said feed pod is located when providing hummingbirds access to said liquid hummingbird food.

3. The hummingbird feeder as recited in claim 1, wherein
   said feed pod is fabricated from a translucent material to provide external visibility of said liquid hummingbird food contained within said reservoir.

4. The hummingbird feeder as recited in claim 1, further comprising:
   a refillable, liquid squeeze container for use in said refilling of said reservoir with said liquid hummingbird food at the site where said feed pod is located when providing hummingbirds access to said liquid hummingbird food.

5. The hummingbird feeder as recited in claim 1, further comprising:
   an elongated stem having a base end and a top end that is attached to said feed pod support and said elongated stem having a configuration adapted to proportionally resemble the actual-size stem of a flower and to allow said feed pod support to be located at a distal location with respect to said base end.

6. The hummingbird feeder as recited in claim 5, further comprising:
   an ant dam that has a configuration adapted to prevent crawling insects from traveling along said feeder so as to reach said feed pod.

7. The hummingbird feeder as recited in claim 6, further comprising:
   a feeding perch that is attached to said flower top and has a configuration adapted to provide a hummingbird with a place to perch while extending the long beak of said hummingbird through said feeding hole of said flower top.

8. The hummingbird feeder as recited in claim 7, further comprising:
   a high perch associated with said ant dam and having a configuration adapted to allow a hummingbird to rest near said feed pod when not feeding.

9. The hummingbird feeder as recited in claim 1, wherein:
   said flower top further having a closing element that has a configuration that is adapted to help prevent said flower top from inadvertently opening due to weather.

10. The hummingbird feeder as recited in claim 1, wherein:
    said specified interior volume of said reservoir is in the range of 10-50 ml so as to allow said feed pod to be adapted to resemble the thickening part of the stem that proportionally makes up the lower part of said single, actual-size flower.

* * * * *